United States Patent
Gumeci et al.

(10) Patent No.: US 10,637,070 B2
(45) Date of Patent: Apr. 28, 2020

(54) HIGHLY POROUS ANODE CATALYST LAYER STRUCTURES FOR FUEL FLEXIBLE SOLID OXIDE FUEL CELLS

(71) Applicant: Nissan North America, Inc., Franklin, TN (US)

(72) Inventors: Cenk Gumeci, Walled Lake, MI (US); David Thompson, Grand Blanc, MI (US)

(73) Assignee: Nissan North America, Inc., Franklin, TN (US)

( * ) Notice: Subject to any disclaimer, the term of this patent is extended or adjusted under 35 U.S.C. 154(b) by 124 days.

(21) Appl. No.: 15/882,376

(22) Filed: Jan. 29, 2018

(65) Prior Publication Data

US 2019/0237770 A1    Aug. 1, 2019

(51) Int. Cl.
| | |
|---|---|
| *H01M 4/90* | (2006.01) |
| *H01M 4/86* | (2006.01) |
| *H01M 8/1213* | (2016.01) |
| *H01M 8/124* | (2016.01) |

(52) U.S. Cl.
CPC ....... *H01M 4/9058* (2013.01); *H01M 4/8621* (2013.01); *H01M 4/8657* (2013.01); *H01M 8/1213* (2013.01); *H01M 2004/8684* (2013.01); *H01M 2008/1293* (2013.01)

(58) Field of Classification Search
None
See application file for complete search history.

(56) References Cited

U.S. PATENT DOCUMENTS

| | | |
|---|---|---|
| 2008/0090127 A1 | 4/2008 | Gorte et al. |
| 2015/0064607 A1 | 3/2015 | Ahn et al. |
| 2017/0062799 A1* | 3/2017 | Song .................. H01M 8/1213 |

FOREIGN PATENT DOCUMENTS

KR    20120121570 A    * 11/2012

* cited by examiner

*Primary Examiner* — Robert S Carrico
(74) *Attorney, Agent, or Firm* — Young Basile Hanlon & MacFarlane, P.C.

(57) ABSTRACT

An anode may be coated with a catalyst layer to improve solid oxide fuel cell (SOFC) efficiency and provide lower operating temperatures. The catalyst layer may be highly porous and may be a core-shell structure or a layered structure. The catalyst layer may be deposited on the anode as a nanoframe structure or a cage structure.

10 Claims, 9 Drawing Sheets

HIGHLY POROUS ANODE CATALYST LAYER STRUCTURES FOR FUEL FLEXIBLE SOLID OXIDE FUEL CELLS

TECHNICAL FIELD

This disclosure relates to structured anode for a solid oxide fuel cell.

BACKGROUND

Solid oxide fuel cells (SOFC)s allow for conversion of electrochemical fuel to electricity with negligible pollution. Among fuel cells under development, the SOFCs operate at temperatures ranging from 500° C. to 1000° C. Because the SOFCs operate at such high temperatures, the materials used as components are thermally challenged.

SUMMARY

Disclosed herein are implementations of SOFCs that include an anode coated with a catalyst layer. The catalyst layer may be highly porous and may improve SOFC efficiency and provide lower operating temperatures. In addition, the catalyst layer may allow for flexibility in the type of fuel used. In the implementations disclosed herein, the catalyst layer may be coated onto the anode in the form of beads (i.e., spheres), cages or frames, and/or fibers or meshes.

In a first aspect, an SOFC may include a current collector, an electrolyte layer, and an anode. The electrolyte layer may be a solid electrolyte layer. The current collector may be referred to as an interconnector.

The anode may include yttria stabilized zirconia (YSZ) that extends between the current collector and the electrolyte layer. In some embodiments, a metal may be deposited on the YSZ. For example, the metal may be nickel (Ni). The anode may include a coating or skin. For example, the coating may be a core-shell structure catalyst material coating that is deposited onto the YSZ and Ni. The coating may be partially in contact with the current collector and partially in contact with the electrolyte layer.

The core-shell structure catalyst material coating may include a core and an outer shell. The core may be a Pt—Ni core and may include one or more sublayers of varying porosity. The loss of Ni during operation may be reduced by having more porous Pt—Ni concentrated in the center of the Pt—Ni core. In this example, the Pt—Ni core may form a random alloy or an intermetallic structure. The outer shell may have an approximate thickness of 3-5 atoms. The outer shell may include Pt, Pd, Au, or Ag. The outer shell may be solid or porous. In the embodiments disclosed herein, the efficiency of the SOFC increases as the porosity of the outer shell decreases. The outer shell may increase the reactivity on the surface and may also reduce the loss of Ni during operation. In an example where the outer shell is porous, the outer shell may have a pore diameter of 2 nm to 50 nm.

In some embodiments, the core-shell structure catalyst material coating may be deposited onto the YSZ and Ni as a cage structure. In some embodiments, the core-shell structure catalyst material coating may be deposited onto the YSZ and Ni as a nanoframe structure. In some embodiments, the core-shell structure catalyst material coating may be deposited onto the YSZ and Ni as a random porous structure.

In another aspect, an SOFC may include a current collector, an electrolyte layer, and an anode. The electrolyte layer may be a solid electrolyte layer. The current collector may be referred to as an interconnector.

The anode in this example may include YSZ that extends between the current collector and the electrolyte layer. In some embodiments, a metal may be deposited on the YSZ. For example, the metal may be Ni. The anode may include a coating or skin. For example, the coating may be a layered structure catalyst material coating that is deposited onto the YSZ and Ni of the anode. The coating may include a first portion that is in contact with the current collector and a second portion that is in contact with the electrolyte layer.

The layered structure catalyst material coating may include a base layer and an outer shell. The base layer may be a Pt—Ni base layer that is in contact with the YSZ and Ni of the anode. The Pt—Ni base layer may include one or more sublayers of varying porosity. For example, the Pt—Ni base layer may include a first sublayer and a second sublayer. The second sublayer may be in contact with the YSZ and Ni of the anode. The porosity of the second sublayer may be 2 nm to 50 nm. In this example, the second sublayer may have a higher porosity than the first sublayer. In other examples, the first sublayer may have a higher porosity than the second sublayer.

The Pt—Ni base layer may form a random alloy structure or an intermetallic structure. The outer shell may have an approximate thickness of 3-5 atoms. The outer shell may include Pt, Pd, Au, or Ag. The outer shell may be solid or porous. The outer shell may have a pore diameter of 2 nm to 50 nm. In some examples, the layered structure catalyst material coating may be deposited onto the YSZ and Ni of the anode as a cage structure or a nanoframe structure.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Typical SOFCs are prone to inefficiency due to impurity formation and reduced electronic and ionic transport. Poisoning due to contaminates such as sulfur in the fuel gas can occur. In addition, the anode layer of typical SOFC are known to react with the current collector causing resistance and instability. The anode structures and the SOFCs that use them enhance ionic and electronic conduction, improve poisoning tolerance and increase gas transport surface area, improving the overall power density of the SOFCs.

At the anode side, a typical material used is a cermet made up of nickel mixed with the ceramic material that is used for the electrolyte in that particular cell, for example YSZ nanomaterial-based catalysts. During operation of the SOFC, it is common for grains of nickel to form. Larger grains of nickel reduce the contact area that ions can be conducted through and reduces efficiency. The YSZ helps prevent grain growth of the nickel. Operation temperatures between 700° C. to 850° C. offer improved performance. The higher temperatures cause larger nickel particle formation that leads to reduced efficiency. In addition, crack formation on the catalyst layer during fuel starvation causes lower cell performance.

Figure 1:
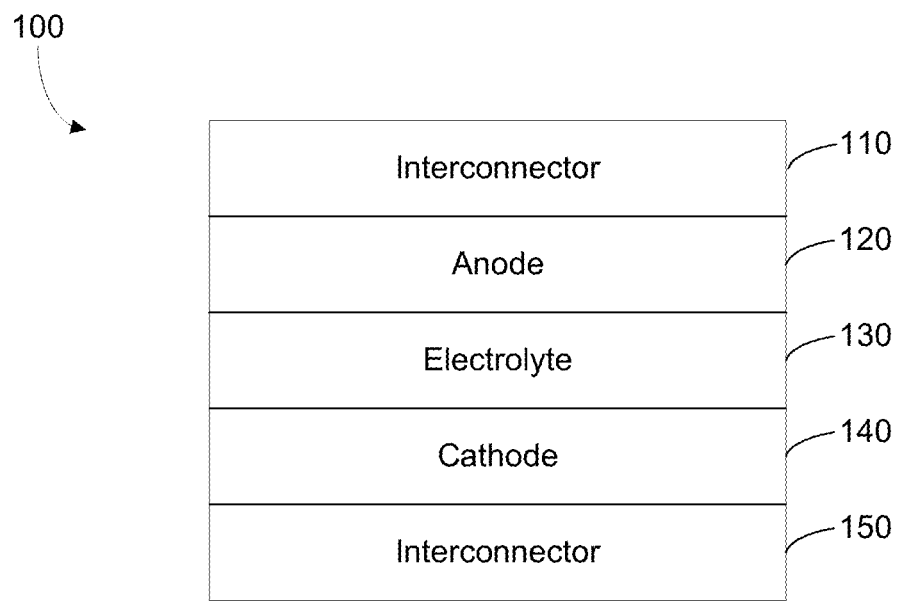
FIG. 1 is a diagram of an example of a solid oxide fuel cell stack.

FIG. 1 is a diagram of an example SOFC stack 100. The SOFC stack 100 includes an interconnector 110, an anode 120, an electrolyte 130, a cathode 140, and an interconnector 150.

Interconnector 110 may be a bipolar plate. Interconnector 110 may also be referred to as a current collector and may be a metallic or a ceramic layer that is disposed on the anode 120. Some examples of a ceramic interconnector composition may include lanthanum chromite and/or yttrium chromite. Suitable dopants for the ceramic interconnector composition may include nickel, cobalt, vanadium, calcium, strontium, magnesium, copper, manganese, and titanium. Some examples of a metallic interconnector composition may include chromia-based alloys, ferritic stainless steel, stainless steel, and iron/nickel-based super alloys.

The interconnector 110 is used to connect two or more SOFCs in series to combine the electricity that each SOFC generates. Because the interconnector 110 is exposed to both the oxidizing and reducing side of the SOFC at high temperatures, it must be constructed from an extremely stable material.

The anode 120 should exhibit catalytic properties and possess high porosity for the mass transport of reactant and product gases. The anodes disclosed herein may have a structure formed of a nickel-based cermet, although a ceria-based anode or a titanium-based anode are also contemplated. One example of a nickel-based cermet that includes YSZ may be referred to as Ni/YSZ. Alternative anode cermet compositions may include a samaria-doped ceria (SDC), for example Ni/SDC or may include a gadolinium-doped ceria (GDC), for example Ni/GDC. Additional anode compositions may include a nickel-based catalyst containing mixtures of cobalt and/or dopants of precious metals such as palladium, rhodium, and/or platinum. The structure provides pathways of YSZ from the current collector 110 to the electrolyte 130, improving ionic transport through the cell. The YSZ is coated with Ni, providing electron transport. The structure increases the surface areas for gas transport and the improved ionic and electronic conduction in the anode, decreasing the overpotentials associated with the adsorption/diffusion charge transfer step in the oxidation reaction. Improving the ionic and electronic conduction in the anode will also result in a reduction in cell operating temperature. Reducing the operating temperature will increase the redox and thermal stability and reliability of the anode.

Electrolyte 130 is a dense electrolyte that is sandwiched between the anode 120 and the cathode 140. The electrolyte 130 is an oxide conducting electrolyte that possesses a fluorite structure or perovskite structure.

Cathode 140 is an air electrode that allows diffusion of gaseous oxygen towards the cathode/electrolyte interface. Cathode 140 compositions may include perovskite materials, for example, lanthanum strontium manganite (LSM)-based perovskites. Other example cathode 140 compositions may include Sr-doped lanthanum ferrite (LSF) materials and Sr-doped lanthanum ferro-cobaltite (LSCF) materials.

Interconnector 150 may be a bipolar plate. Interconnector 150 may also be referred to as a current collector and may be a metallic or a ceramic layer that is disposed on the cathode 140. Some examples of a ceramic interconnector composition may include lanthanum chromite and/or yttrium chromite. Suitable dopants for the ceramic interconnector composition may include nickel, cobalt, vanadium, calcium, strontium, magnesium, copper, manganese, and titanium. Some examples of a metallic interconnector composition may include chromia-based alloys, ferritic stainless steel, stainless steel, and iron/nickel-based super alloys.

The interconnector 150 is used to connect two or more SOFCs in series to combine the electricity that each SOFC generates. Because the interconnector 150 is exposed to both the oxidizing and reducing side of the SOFC at high temperatures, it must be constructed from an extremely stable material.

Figure 2:
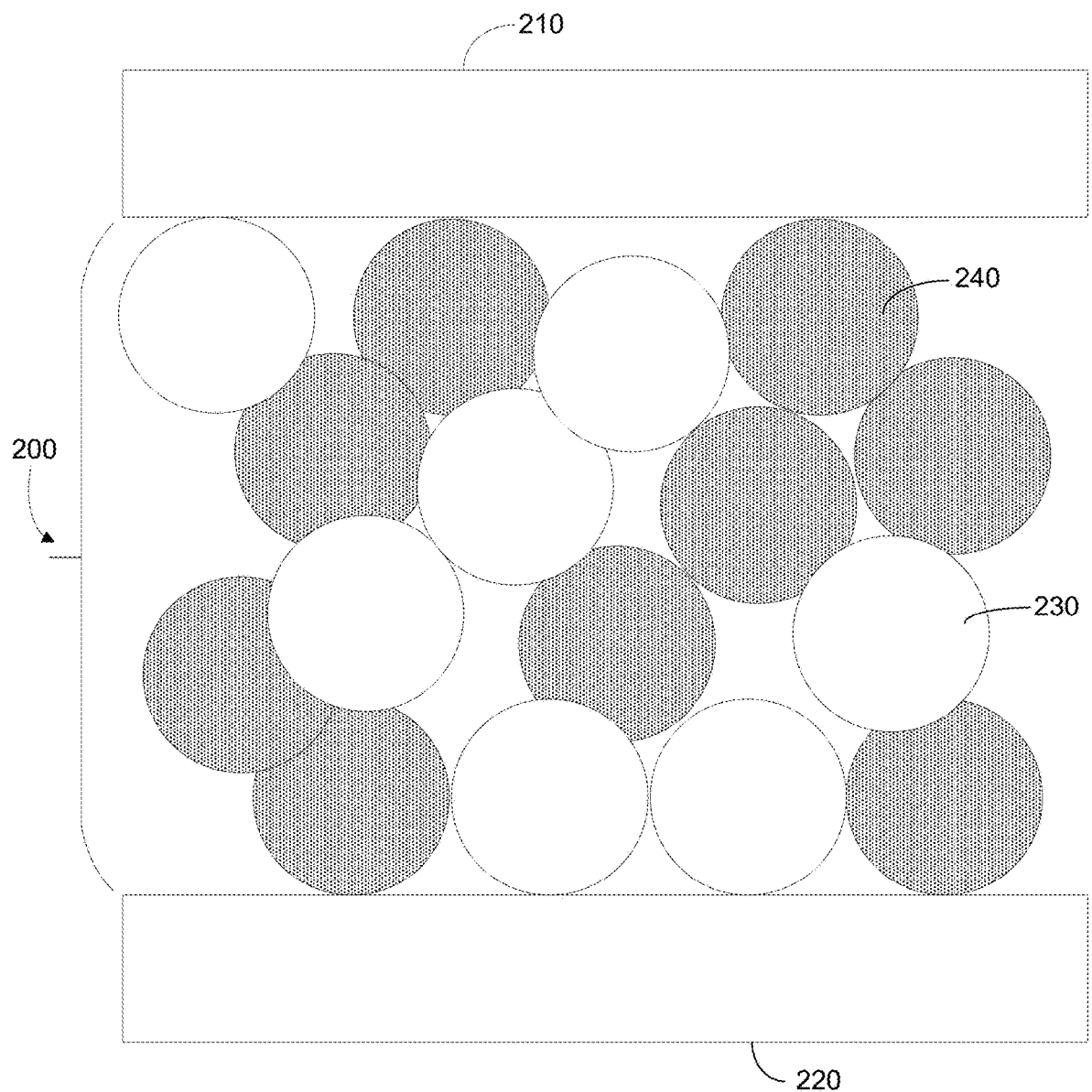
FIG. 2 is a diagram of an example anode layer of the solid oxide fuel cell stack of FIG. 1.

FIG. 2 is a diagram of an example anode layer 200 of the SOFC stack of FIG. 1. As shown in FIG. 2, the anode layer 200 is in contact with a current collector 210 and a solid electrolyte layer 220. The current collector 210 may be a ferritic steel or any other suitable material. The anode layer 200 is a Ni—YSZ anode that includes YSZ particles 230 and Ni particles 240 (shown in stippling) that each extend between the current collector 210 and the solid electrolyte layer 220. The Ni—YSZ anode is shown merely for example, and it is understood that the anode layer 200 may be constructed of any suitable material. For example, the anode layer 200 may be any suitable material including, but not limited to, nickel-cerium samarium oxide (NiO/SDC) or nickel-scandia-stabilized zirconia (Ni/ScSZ-10).

Figure 3:
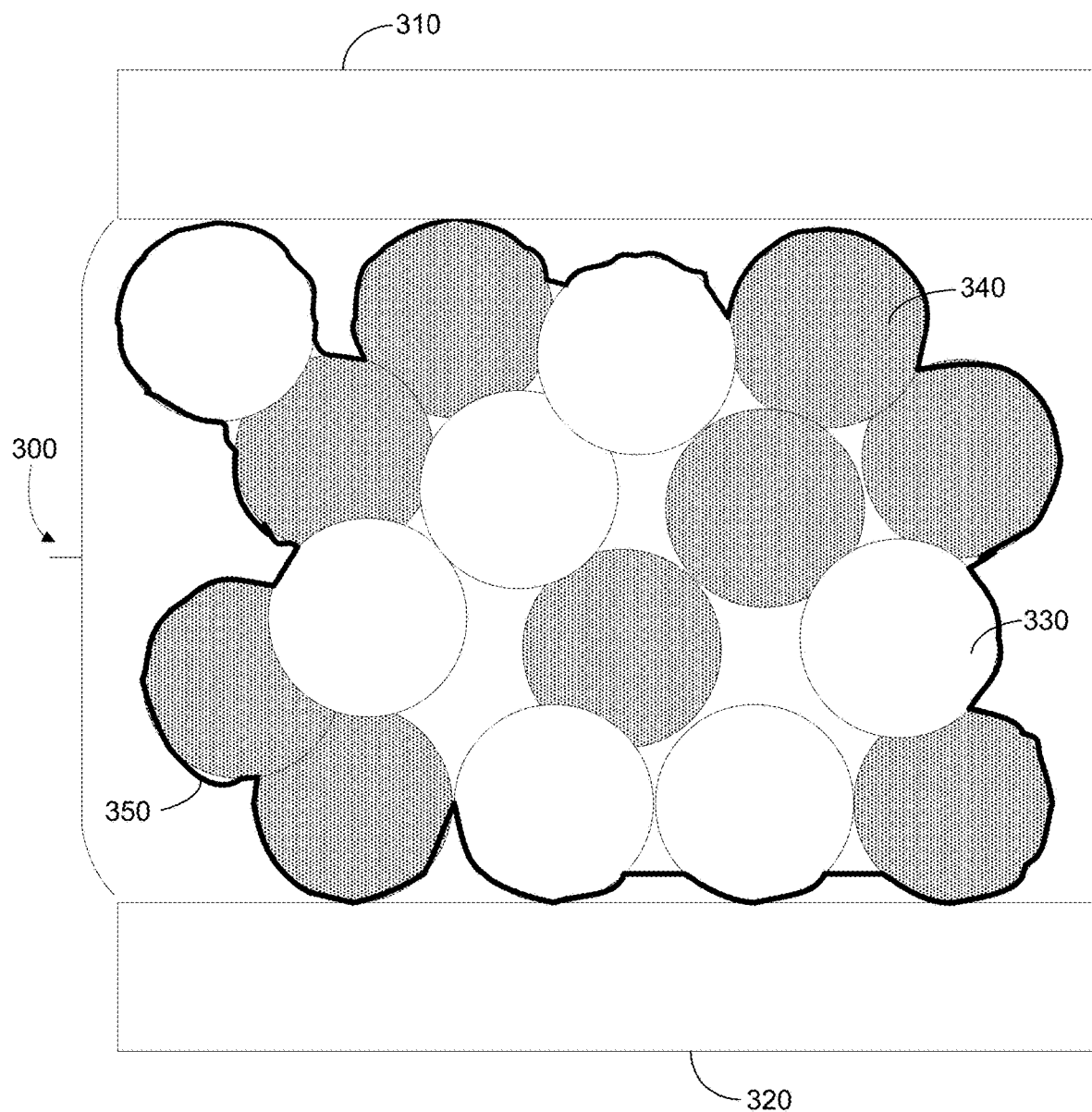
FIG. 3 is a diagram of an example embodiment showing a cross-sectional view of an anode coated in a catalyst material.

FIG. 3 is a diagram of an example embodiment showing a cross-sectional view of an anode layer 300 coated in a catalyst material. As shown in FIG. 3, the anode layer 300 extends between a current collector 310 and a solid electrolyte layer 320. The current collector 310 may be a ferritic steel or any other suitable material. In this example, the anode layer 300 is a Ni—YSZ anode that includes YSZ particles 330 and Ni particles 340 (shown in stippling) that each extend between the current collector 310 and the solid electrolyte layer 320. The Ni—YSZ anode is shown merely for example, and it is understood that the anode layer 300 may be constructed of any suitable material. For example, the anode layer 300 may be any suitable material including, but not limited to, NiO/SDC or Ni/ScSZ-10.

As shown in FIG. 3, the anode layer 300 is coated with a catalyst material 350. The catalyst material 350 may be deposited onto the anode using an atomic layer deposition (ALD) technique. For example, the ALD technique may be a thin-film deposition technique based on the sequential use of a gas phase chemical process.

Figure 5:
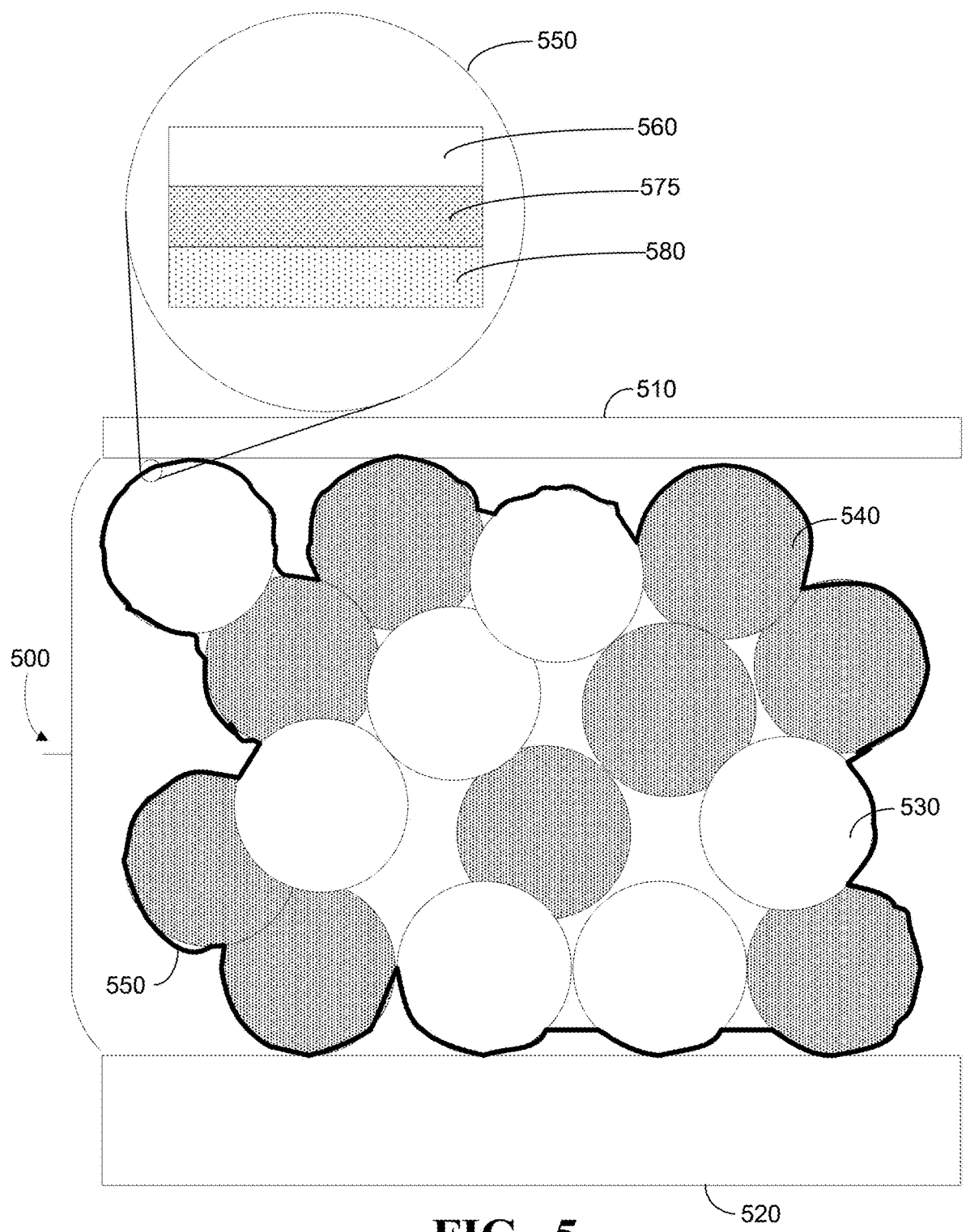
FIG. 5 is a diagram of a cross-sectional view of the example embodiment of a layered catalyst material coating.
Figure 6:
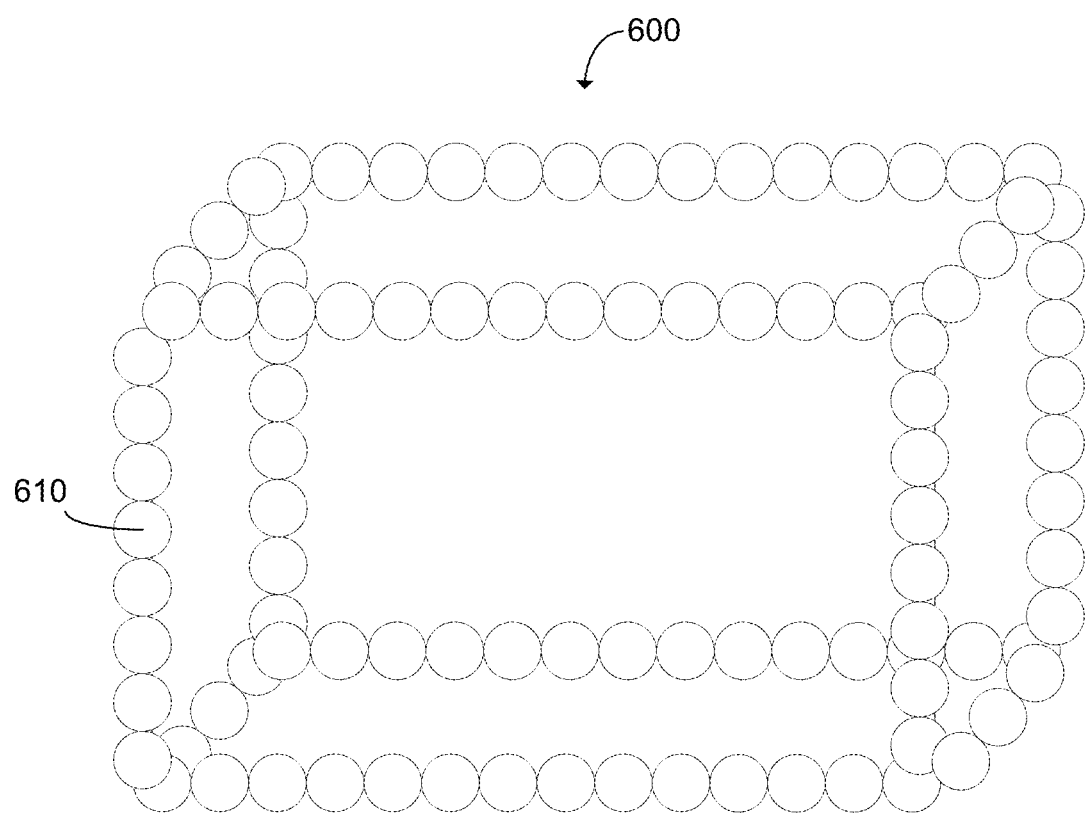
FIG. 6 is a diagram of an example of a nanocube or cage structure.
Figure 7:
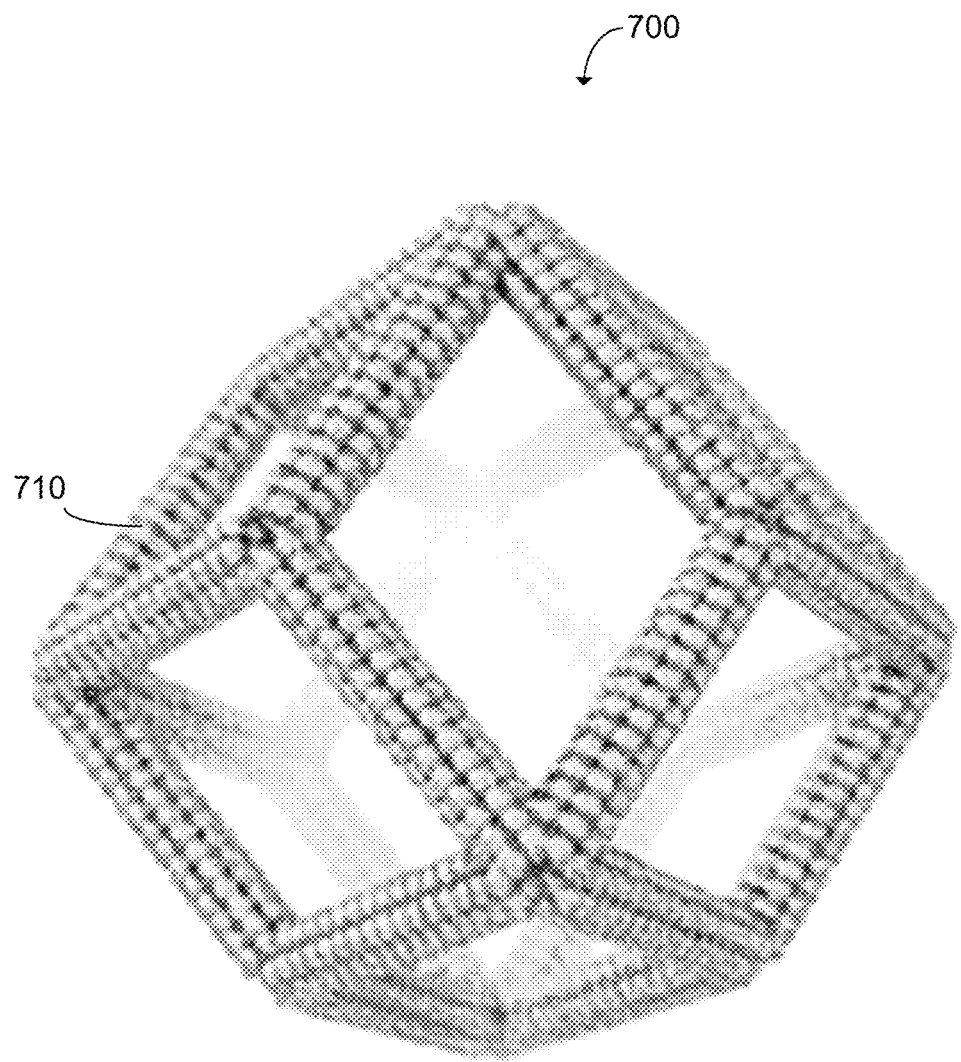
FIG. 7 is a diagram of an example of a nanoframe structure.

The catalyst material 350 may increase the cell performance, lower the operating temperature to 300° C. to 400° C., and prevent crack formation during fuel starvation, thereby making it a suitable application for automobiles. The catalyst material 350 may include an active material such as a Pt, Pd, or PtPd alloy and may be solid or porous. An inner core of the catalyst material 350 may include the active material and any suitable metal such as, for example, Ni, Co, and/or Fe. For example, the catalyst material 350 may include an outer shell of Pt and an inner core of Pt—Ni. The outer shell may be 3-5 atoms in thickness. The Pt outer shell may lower the operating temperature of the cell. The Pt outer shell may be replaced by Pd, Au, or Ag based on the type of fuel being employed. For example, fuels such as methanol, ethanol, dimethyl ether may be used in addition to typical fuels such as hydrogen and methane. The catalyst material 350 may be a core-shell structure as shown in FIGS. 4A and 4B, a layered structure as shown in FIG. 5, a nanocube or cage structure as shown in FIG. 6, a nanoframe structure as shown in FIG. 7, or a random porous structure such as a random alloy structure shown in FIG. 8A or an intermetallic structure shown in FIG. 8B.

Figure 4A:
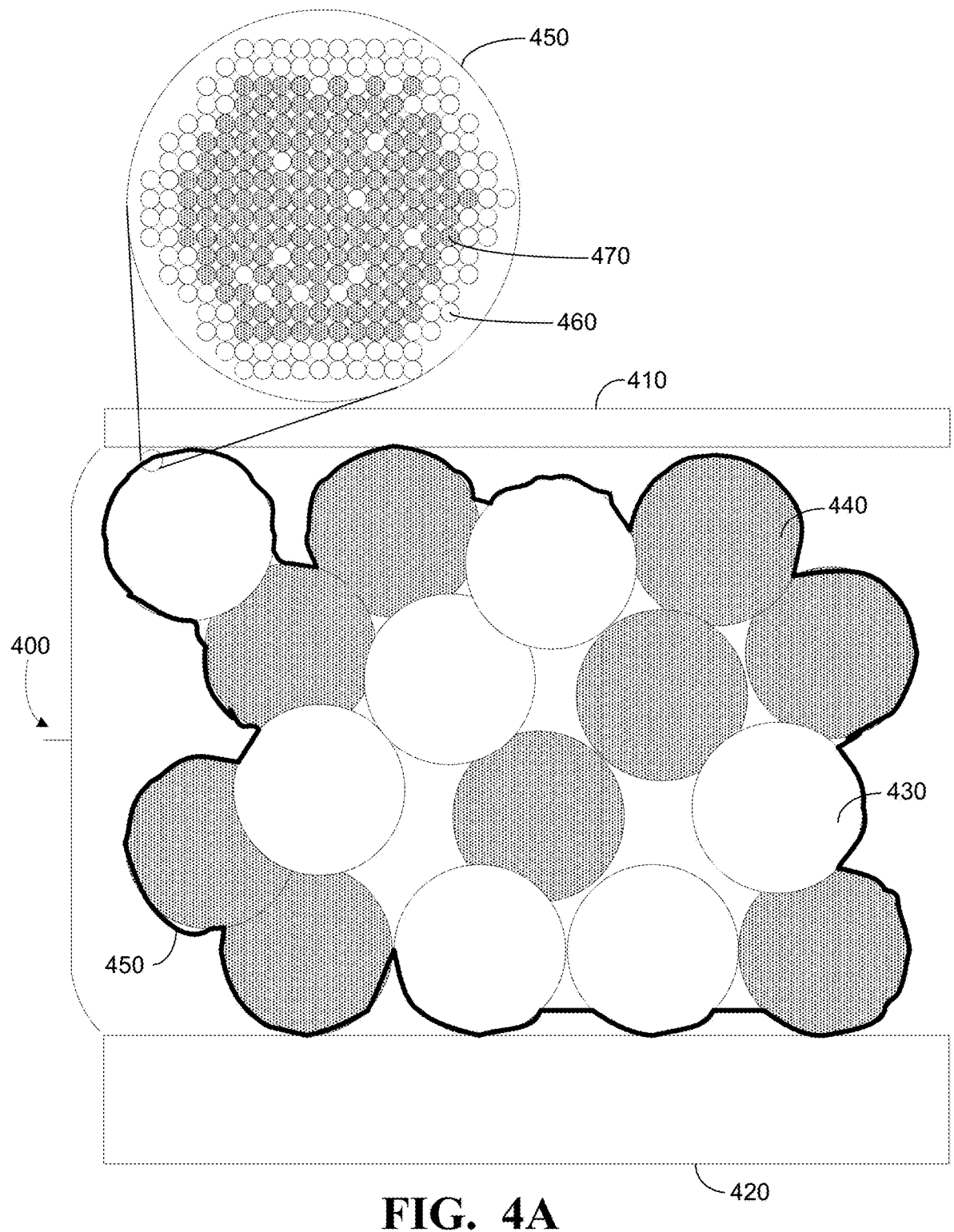
FIG. 4A is a diagram of a cross-sectional view of an example of a core-shell structure catalyst material coating.

FIG. 4A is a diagram of a cross-sectional view of an example of a core-shell structure catalyst material coating deposited on an anode layer 400. As shown in FIG. 4A, the anode layer 400 extends between a current collector 410 and a solid electrolyte layer 420. The current collector 410 may be a ferritic steel or any other suitable material. In this example, the anode layer 400 is a Ni—YSZ anode that includes YSZ particles 430 and Ni particles 440 (shown in stippling) that each extend between the current collector 410 and the solid electrolyte layer 420. The Ni—YSZ anode is shown merely for example, and it is understood that the anode layer 400 may be constructed of any suitable material. For example, the anode layer 400 may be any suitable material including, but not limited to, NiO/SDC or Ni/ScSZ-10.

Figure 8A:
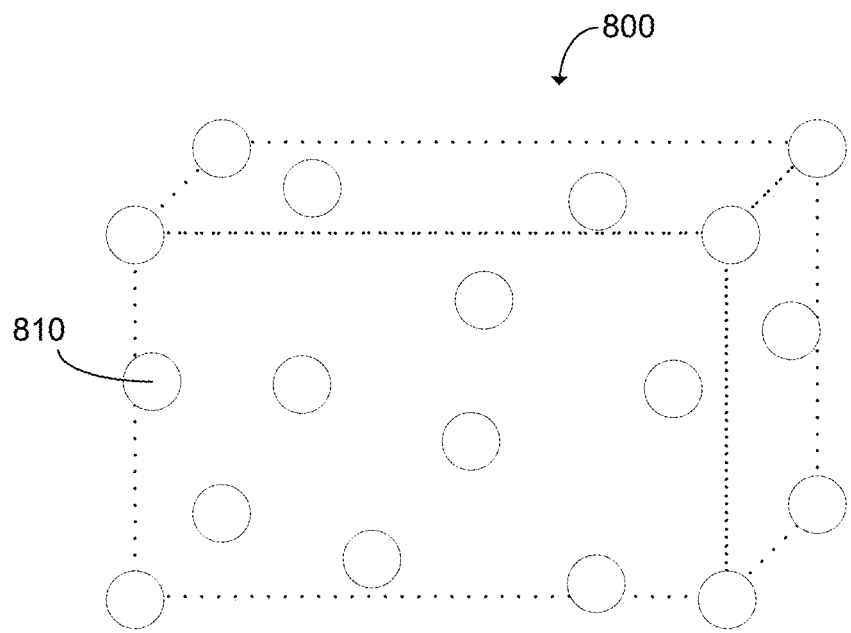
FIG. 8A is a diagram of an example of a random alloy structure.
Figure 8B:
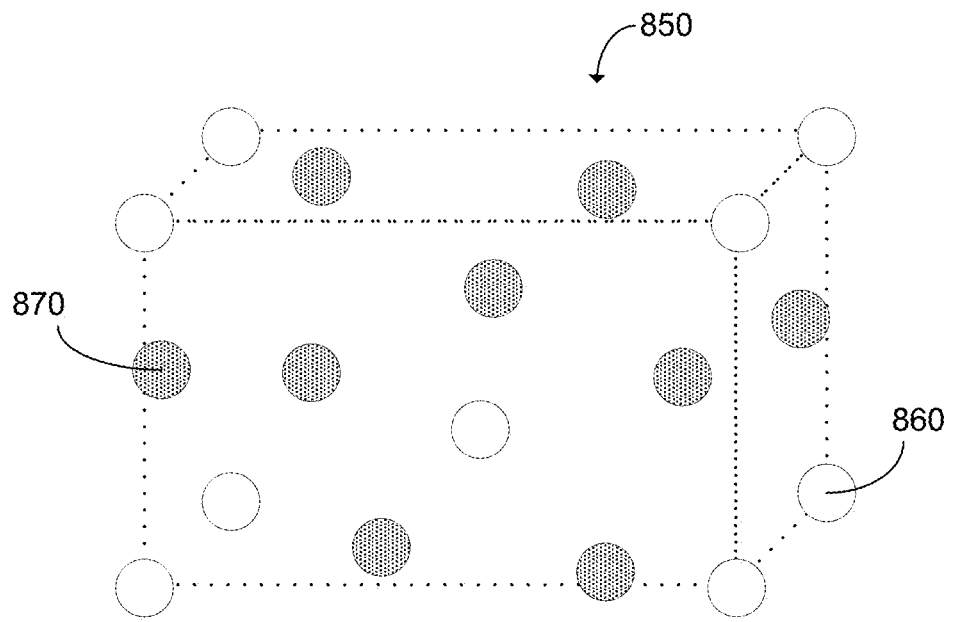
FIG. 8B is a diagram of an example of an intermetallic structure.

As shown in FIG. 4A, the anode layer 400 is coated with a catalyst material 450. In this example, the catalyst material 450 is a core-shell structure that has an outer shell 460 and an inner core 470 (shown in stippling). In this example, the outer shell 460 may be Pt, Pd, Au, or Ag. The outer shell may have a thickness of 3-5 atoms, and it may be solid or porous. In an example where the outer shell 460 is porous, the outer shell may have a pore diameter of 2 nm to 50 nm. The inner core 470 may be Pt—Ni. The inner core 470 may have a thickness between 7 nm and 50 nm. The inner core 470 may be microporous having a porosity of less than 2 nm. The Pt—Ni may form a random alloy as shown in FIG. 8A or an intermetallic structure as shown in FIG. 8B. In some embodiments, the core-shell structure catalyst material 450 may be deposited on the anode layer 400 as a nanocube or cage structure as shown in FIG. 6 or a nanoframe structure as shown in FIG. 7.

Figure 4B:
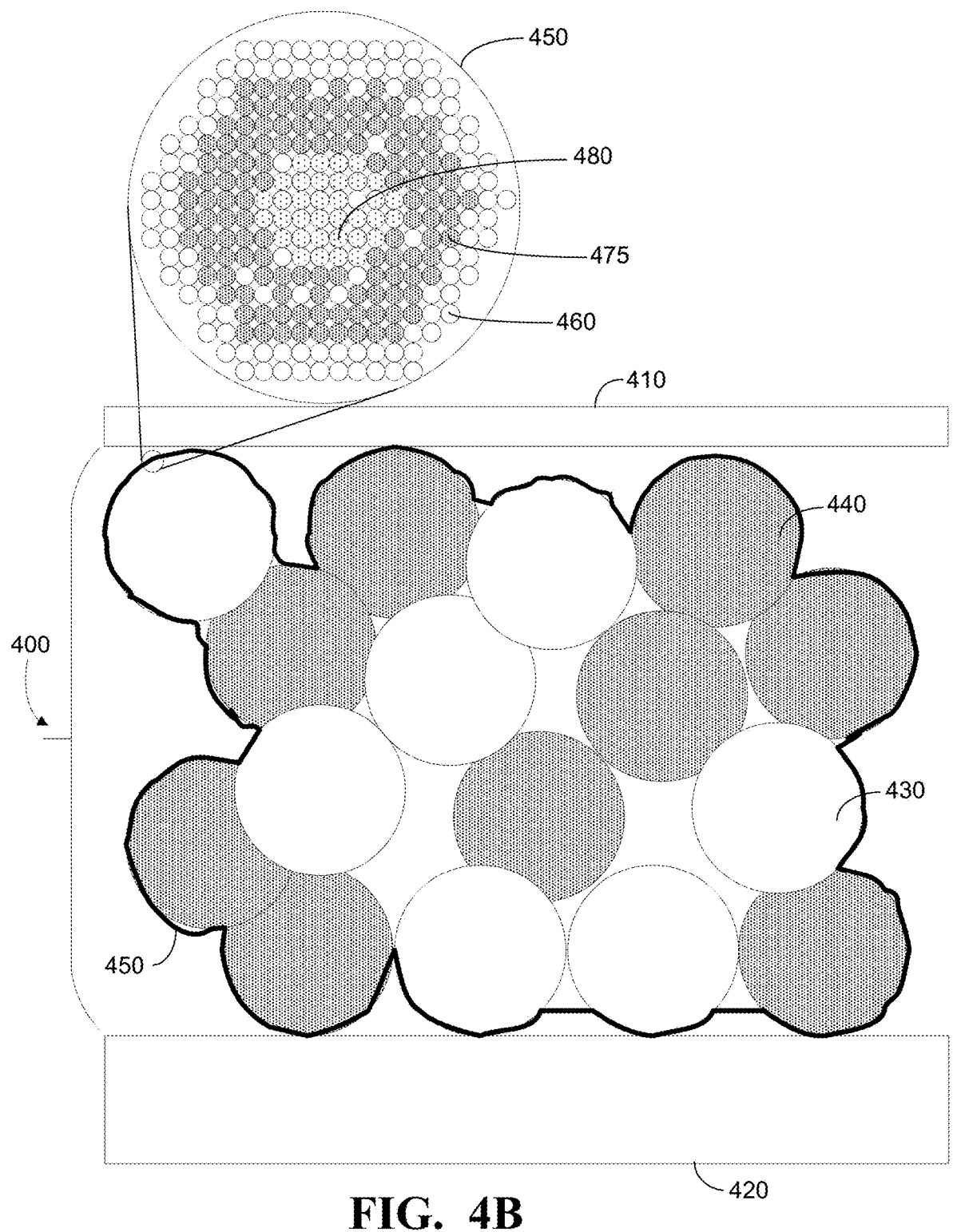
FIG. 4B is a diagram of a cross-sectional view of another example of a core-shell structure catalyst material coating.

FIG. 4B is a diagram of a cross-sectional view of another example of a core-shell structure catalyst material coating deposited on the anode layer 400. As shown in FIG. 4B, the anode layer 400 extends between the current collector 410 and the solid electrolyte layer 420. The current collector 410 may be a ferritic steel or any other suitable material. In this example, the anode layer 400 is a Ni—YSZ anode that includes YSZ particles 430 and Ni particles 440 (shown in stippling) that each extend between the current collector 410 and the solid electrolyte layer 420. The Ni—YSZ anode is shown merely for example, and it is understood that the anode layer 400 may be constructed of any suitable material. For example, the anode layer 400 may be any suitable material including, but not limited to, NiO/SDC or Ni/ScSZ-10.

As shown in FIG. 4B, the anode layer 400 is coated with a catalyst material 450. In this example, the catalyst material 450 is a core-shell structure that has an outer shell 460 and an inner core that includes a first sublayer 475 (shown in dark stippling) and a second sublayer 480 (shown in light stippling). In this example, the inner core is shown to have two sublayers, however some embodiments may have an inner core with more than two sublayers. In this example, the first sublayer 475 is adjacent to and in contact with the outer shell 460. The first sublayer 475 may be solid or it may contain up to 10% of micropores. The second sublayer 480 may have a greater porosity than the first sublayer 475. The porosity of the second sublayer 480 may be in the mesoporous range, for example 2 nm to 50 nm. The first sublayer 475 and the second sublayer 480 may each have a thickness of 2 nm to 5 nm.

In this example, the outer shell 460 may be Pt, Pd, Au, or Ag. The outer shell 460 may have a thickness of 3-5 atoms, and it may be solid or porous. In an example where the outer shell 460 is porous, the outer shell may have a pore diameter of 2 nm to 50 nm. The first sublayer 475 and the second sublayer 480 may each be Pt—Ni or they may each be different materials. The Pt—Ni may form a random alloy as shown in FIG. 8A or an intermetallic structure as shown in FIG. 8B. In some embodiments, the core-shell structure catalyst material 450 may be deposited on the anode layer 400 as a nanocube or cage structure as shown in FIG. 6 or a nanoframe structure as shown in FIG. 7.

FIG. 5 is a diagram of a cross-sectional view of the example embodiment of a layered catalyst material coating deposited on an anode layer 500. As shown in FIG. 5, the anode layer 500 extends between a current collector 510 and a solid electrolyte layer 520. The current collector 510 may be a ferritic steel or any other suitable material. In this example, the anode layer 500 is a Ni—YSZ anode that includes YSZ particles 430 and Ni particles 540 (shown in stippling) that each extend between the current collector 510 and the solid electrolyte layer 520. The Ni—YSZ anode is shown merely for example, and it is understood that the anode layer 500 may be constructed of any suitable material. For example, the anode layer 500 may be any suitable material including, but not limited to, NiO/SDC or Ni/ScSZ-10.

As shown in FIG. 5, the anode layer 500 is coated with a catalyst material 550. In this example, the catalyst material 550 is a layered structure that has an outer shell 560 and a base layer that includes a first sublayer 575 (shown in dark stippling) and a second sublayer 580 (shown in light stippling). In this example, the base layer is shown to have two sublayers, however some embodiments may have a single layer base layer or a base layer with more than two sublayers. In this example, the first sublayer 575 is adjacent to and in contact with the outer shell 560. The first sublayer 575 may be solid or it may contain up to 10% of micropores. The second sublayer 580 may have a greater porosity than the first sublayer 575. The porosity of the second sublayer 580 may be in the mesoporous range, for example 2 nm to 50 nm. The first sublayer 575 and the second sublayer 480 may each have a thickness of 2 nm to 5 nm.

In this example, the outer shell 560 may be Pt, Pd, Au, or Ag. The outer shell 560 may have a thickness of 3-5 atoms, and it may be solid or porous. In an example where the outer shell 560 is porous, the outer shell may have a pore diameter of 2 nm to 50 nm. The first sublayer 575 and the second sublayer 580 may each be Pt—Ni. The Pt—Ni may form a random alloy as shown in FIG. 8A or an intermetallic structure as shown in FIG. 8B.

FIG. 6 is a diagram of an example of a nanocube 600 or cage structure. As shown in FIG. 6, the nanocube 600 is constructed of particles 610. Each particle 610 represents a core-shell catalyst material structure as described in FIGS. 4A and 4B. The arrangement of particles 610 creates an open structure with a pore size in the mesoporous region. For example, the pore size created may be 2 nm to 50 nm.

FIG. 7 is a diagram of an example of a nanoframe structure 700. As shown in FIG. 7, the nanoframe structure 700 is constructed of particles 710. Each particle 710 represents a core-shell catalyst material structure as described in FIGS. 4A and 4B. The arrangement of particles 710 creates an open structure with a pore size in the mesoporous region. For example, the pore size created may be 2 nm to 50 nm.

FIG. 8A is a diagram of an example of a random alloy structure 800. The random alloy structure 800 is an example construction of the inner core and/or sublayers described in FIGS. 3, 4A, 4B, and 5. The random alloy structure 800 may include particles 810 containing an active material such as Pt or Pd and any suitable metal such as, for example, Ni, Co, and/or Fe. In this example, each particle 810 is a Pt—Ni particle.

FIG. 8B is a diagram of an example of an intermetallic structure 850. The intermetallic structure 850 is an example construction of the inner core and/or sublayers described in FIGS. 3, 4A, 4B, and 5. The intermetallic structure 850 may include particles containing an active material such as Pt or Pd and any suitable metal such as, for example, Ni, Co, and/or Fe. In this example, particle 860 may be a Pt particle and particle 870 may be a Ni particle together which form a Pt—Ni intermetallic compound.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A solid oxide fuel cell, comprising:
   a current collector;
   a solid electrolyte layer; and
   an anode comprising:
      yttria stabilized zirconia (YSZ) extending between the current collector and the solid electrolyte layer;
      nickel (Ni) deposited on the YSZ; and
      a core-shell structure catalyst material coating deposited onto the YSZ and Ni comprising a first portion in contact with the current collector and a second portion in contact with the solid electrolyte layer, wherein the core-shell structure catalyst material coating comprises a Pt—Ni core and an outer shell.

2. The solid oxide fuel cell of claim 1, wherein the Pt—Ni core forms a random alloy.

3. The solid oxide fuel cell of claim 1, wherein the Pt—Ni core forms an intermetallic structure.

4. The solid oxide fuel cell of claim 1, wherein the outer shell is 3-5 atoms in thickness.

5. The solid oxide fuel cell of claim 1, wherein the outer shell is Pt, Pd, Au, or Ag.

6. The solid oxide fuel cell of claim 1, wherein the outer shell is porous.

7. The solid oxide fuel cell of claim 6, wherein the outer shell has a pore diameter of 2 nm to 50 nm.

8. The solid oxide fuel cell of claim 7, wherein the core-shell structure catalyst material coating is deposited onto the YSZ and Ni as a cage structure.

9. The solid oxide fuel cell of claim 7, wherein the core-shell structure catalyst material coating is deposited onto the YSZ and Ni as a nanoframe structure.

10. The solid oxide fuel cell of claim 7, wherein the core-shell structure catalyst material coating is deposited onto the YSZ and Ni as a random porous structure.

* * * * *